(12) United States Patent
Zhang

(10) Patent No.: US 10,360,731 B2
(45) Date of Patent: Jul. 23, 2019

(54) METHOD AND DEVICE FOR IMPLEMENTING VIRTUAL FITTING

(71) Applicants: BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Sicong Zhang, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 15/319,500

(22) PCT Filed: Jun. 11, 2015

(86) PCT No.: PCT/CN2015/081264
§ 371 (c)(1),
(2) Date: Dec. 16, 2016

(87) PCT Pub. No.: WO2015/192733
PCT Pub. Date: Dec. 23, 2015

(65) Prior Publication Data
US 2017/0154470 A1 Jun. 1, 2017

(30) Foreign Application Priority Data
Jun. 17, 2014 (CN) .......................... 2014 1 0270449

(51) Int. Cl.
| | | |
|---|---|---|
| G06K 9/52 | (2006.01) | |
| G06K 9/00 | (2006.01) | |
| G06T 19/00 | (2011.01) | |
| G06Q 30/06 | (2012.01) | |
| G06T 11/60 | (2006.01) | |
| G06T 11/00 | (2006.01) | |

(52) U.S. Cl.
CPC ........ *G06T 19/006* (2013.01); *G06K 9/00228* (2013.01); *G06K 9/00261* (2013.01);
(Continued)

(58) Field of Classification Search
None
See application file for complete search history.

(56) References Cited

U.S. PATENT DOCUMENTS

2013/0006814 A1* 1/2013 Inoue ................. G06Q 30/0603
705/26.81
2013/0088490 A1* 4/2013 Rasmussen ............. G06T 17/00
345/421

(Continued)

FOREIGN PATENT DOCUMENTS

| CN | 1866292 A | 11/2006 |
|---|---|---|
| CN | 102867321 A | 1/2013 |

(Continued)

OTHER PUBLICATIONS

International Search Report and Written Opinion with English translation for Application No. PCT/CN2015/081264 dated Aug. 26, 2015 (12 pages).

*Primary Examiner* — Peter Hoang
(74) *Attorney, Agent, or Firm* — Michael Best & Friedrich LLP

(57) ABSTRACT

The invention provides methods and devices for implementing virtual fitting utilizing an image capturing device such as a camera on a mobile phone or a computer. The method for implementing virtual fitting of the invention comprises: detecting a face on a captured initial frame, generating an article image at an initial position when the face has been detected, and then superimposing the article image on the initial frame for output, the initial position superimposed on a specific position of the face in the initial frame; detecting a facial posture on the face in the current frame to obtain the (Continued)

facial posture of the current frame; and generating the article image again according to a current position of the article image and the facial posture, making an article posture in the article image be consistent with the facial posture, and then superimposing the article image on the current frame for output.

10 Claims, 4 Drawing Sheets

(52) U.S. Cl.
CPC ..... *G06K 9/00268* (2013.01); *G06K 9/00302* (2013.01); *G06K 9/52* (2013.01); *G06Q 30/0641* (2013.01); *G06T 11/00* (2013.01); *G06T 11/60* (2013.01)

(56) References Cited

U.S. PATENT DOCUMENTS

| | | | |
|---|---|---|---|
| 2013/0141468 A1* | 6/2013 | Coon | G09G 5/00 345/661 |
| 2013/0322685 A1 | 12/2013 | Li et al. | |
| 2015/0382123 A1* | 12/2015 | Jobani | H04R 1/1016 700/98 |
| 2017/0293286 A1* | 10/2017 | Aggarwal | G05B 19/4099 |

FOREIGN PATENT DOCUMENTS

| | | |
|---|---|---|
| CN | 103400119 A | 11/2013 |
| CN | 104217350 A | 12/2014 |

* cited by examiner

METHOD AND DEVICE FOR IMPLEMENTING VIRTUAL FITTING

CROSS-REFERENCE TO RELATED APPLICATIONS

This application is a national stage filing under 35 U.S.C. § 371 of International Application No. PCT/CN2015/081264 filed Jun. 11, 2015, which claims the foreign priority benefit of Chinese Patent Application No. 201410270449.X filed Jun. 17, 2014, which are incorporated by reference herein in their entireties.

TECHNICAL FIELD

The invention relates to computer technology, and in particular to a method and device for implementing virtual fitting.

BACKGROUND ART

Along with development of e-commerce, online shopping becomes a selection for more and more users. Dress and personal adornments serve as one of main consumption goods, and also become targets of the online shopping for many users. The dress and personal adornments are generally required to be tried on when they are purchased, so a virtual fitting technique emerges as the times require.

The current virtual fitting technique mainly includes the following two realization ways:
1. Fitting by a Synthetic Model This method makes a model of a human body or a part of the human body generated beforehand wear virtual goods to give an effect of the virtual fitting to the user. This manner does not have actual body information of the user, and the fitting effect is not good.
2. Fitting by a Special Device Capturing True Human Body Information This method utilizes a special device such as a depth of field sensor to capture actual body information of the user to form a model of a human body or a part of the human body for the fitting by the user. Although such manner obtains the actual body information of the user, a special device is required, which special device is generally possessed in a special place provided by a seller. A general user only has a common image capturing device such as a camera provided on a mobile phone or on a computer.

SUMMARY OF THE INVENTION

In view of this, the invention provides a method and device for implementing virtual fitting, which can make a user implement the virtual fitting by utilizing a common image capturing device such as a camera on a mobile phone or on a computer.

In order to achieve the above object, according to one aspect of the invention, a method for implementing virtual fitting is provided.

The method for implementing virtual fitting according to the invention comprises: detecting a face on a captured initial frame, and in a case that the face has been detected, generating an article image at an initial position superimposed on the initial frame for output, the initial position superimposed on a specific position of the face in the initial frame; detecting a facial posture on the face in the current frame to obtain the facial posture of the current frame; and generating the article image again according to a current position of the article image and the facial posture, making an article posture in the article image be consistent with the facial posture, and then superimposing the article image on the current frame for output.

Optionally, the step of detecting a facial posture on the face in the current frame to obtain the facial posture of the current frame comprises: determining a plurality of feature points on a facial image in the initial frame; performing the following processes with respect to each of the feature points: tracking the feature point to determine a position of the feature point in the current frame, performing an affine transformation on an adjacent domain of the feature point in the initial frame according to a facial posture of a previous frame to obtain a projection area of the adjacent domain in the current frame, computing a color offset between the adjacent domain in the initial frame and the projection area in the current frame and using it as a tracking deviation of the feature point, and selecting a plurality of feature points having comparatively small tracking deviations for the determined plurality of feature points; and determining the facial posture of the current frame according to positions of the plurality of feature points having the comparatively small tracking deviations in the initial frame and in the current frame.

Optionally, the step of selecting a plurality of feature points having comparatively small tracking deviations for the plurality of feature points comprises: for the tracking deviations of the determined plurality of feature points, by using the maximum value and the minimum value therein as initial centers, obtaining two classes by performing clustering according to the magnitudes of the tracking deviations; and selecting the feature points corresponding to one class having the comparatively small tracking deviations in the two classes.

Optionally, after the step of determining the facial posture of the current frame, the method further comprises: projecting the feature points corresponding to one class having the comparatively large tracking deviations in the two classes onto an image plane of the current frame according to the facial posture of the current frame, and using projection positions to replace the positions of these feature points in the current frame.

Optionally, before the step of detecting a face on a captured initial frame, the method further comprises: using the captured current frame as the initial frame in a case of receiving a reset instruction; after the step of obtaining two classes by performing clustering according to the magnitudes of the tracking deviations, the method further comprises: outputting prompt information and then receiving the reset instruction in a case that a proportion of the number of the one class of the feature points having the comparatively small tracking deviations to the total number of the feature points is smaller than a first preset value, or a proportion of the number of the feature points captured in the current frame to the total number of the feature points captured in the previous frame is smaller than a second preset value.

Optionally, the article image is a glasses image, a head jewelry image, or a neck jewelry image.

According to the other aspect of the invention, a device for implementing virtual fitting is provided.

The device for implementing virtual fitting of the invention comprises: a facial detection module for detecting a face on a captured initial frame; a first output module, for generating an article image at an initial position in a case that the facial detection module has captured a face, superimposing the article image on the initial frame for output, the initial position superimposed on a specific position of the face in the initial frame; a facial posture detection module for detecting a facial posture on the face in the current frame to obtain the facial posture of the current frame; and a second output module for generating the article image again according to a current position of the article image and the facial posture, making an article posture in the article image be consistent with the facial posture, and then superimposing the article image on the current frame for output.

Optionally, the facial posture detection module is further used for: determining a plurality of feature points on a facial image in the initial frame; performing the following processes with respect to each of the feature points: tracking the feature point to determine a position of the feature point in the current frame, performing an affine transformation on an adjacent domain of the feature point in the initial frame according to a facial posture of a previous frame to obtain a projection area of the adjacent domain in the current frame, computing a color offset between the adjacent domain in the initial frame and the projection area in the current frame and using it as a tracking deviation of the feature point, and selecting a plurality of feature points having comparatively small tracking deviations for the determined plurality of feature points; and determining the facial posture of the current frame according to positions of the plurality of feature points having the comparatively small tracking deviations in the initial frame and in the current frame.

Optionally, the facial posture detection module is further used for: for the tracking deviations of the determined plurality of feature points, by using the maximum value and the minimum value therein as initial centers, obtaining two classes by performing clustering according to the magnitudes of the tracking deviations; and selecting the feature points corresponding to one class having the comparatively small tracking deviations in the two classes.

Optionally, the device further comprises a modification module for projecting the feature points corresponding to the one class having the comparatively large tracking deviations in the two classes onto an image plane of the current frame according to the facial posture of the current frame, after the facial posture detection module determines the facial posture of the current frame, and using projection positions to replace the positions of these feature points in the current frame.

Optionally, the device further comprises a reset module and a prompt module, wherein the reset module is used for receiving a reset instruction, and using the captured current frame as the initial frame in a case of receiving the reset instruction; and the prompt module is used for outputting prompt information in a case that a proportion of the number of the feature points corresponding to the one class having the comparatively small tracking deviations to the total number of the feature points is smaller than a first preset value, or a proportion of the number of the feature points captured in the current frame to the total number of the feature points captured in the previous frame is smaller than a second preset value, after the facial posture detection module obtains two classes by performing clustering according to the magnitudes of the tracking deviations.

Optionally, the article image is a glasses image, a head jewelry image, or a neck jewelry image.

According to the technical solution of the invention, by detecting the facial postures of the respective frames and then adjusting glasses postures according to the facial postures, the user can be made to implement the virtual fitting by utilizing a common image capturing device, and the user may rotate his or her head to observe wearing effects at multiple angles, which has a comparatively high reality.

BRIEF DESCRIPTION OF THE DRAWINGS

Figures are used for better understanding the invention, and do not form improper limitations of the invention. Wherein.

DETAILED DESCRIPTION

The contents below give descriptions of exemplary embodiments of the invention by taking the figures into consideration, and the contents include various details of the embodiments of the invention to facilitate understanding, and shall be considered as exemplary ones only. Thus, those skilled in the art should realize that the embodiments described herein can be changed and modified in various manners without departing from the scope and spirit of the invention. Similarly, for clarity and conciseness, descriptions of common functions and structures are omitted in the descriptions below.

The virtual fitting technique of the embodiment of the invention can be applied to a mobile phone having a camera or applied to a computer to which a camera is connected or in which a camera is built, including a tablet computer. Fitting of articles such as glasses and jewelries can be achieved. In this embodiment, descriptions are given by taking the fitting of the glasses as an example. During use, a user selects the glasses to be tried on, aligns the camera with his or her face, and performs a one-click to a screen or a specified key, and at this time, the camera captures a head portrait of the user and presents the glasses at eyes of the head portrait of the user. The user can click the glasses on the screen and translate the glasses to further adjust a positional relationship between the glasses and the eyes. The user can rotate his or her neck up and down or left and right to view wearing effects of the glasses at various angles. In this process, the technique of this embodiment is applied to keep a posture of the glasses in a glasses image on the screen consistent with a posture of the face, so that the glasses can move by tracking the face to achieve a fixed wear of the glasses at the face. The contents below describe the technical solution of the embodiment of the invention.

Figure 1:
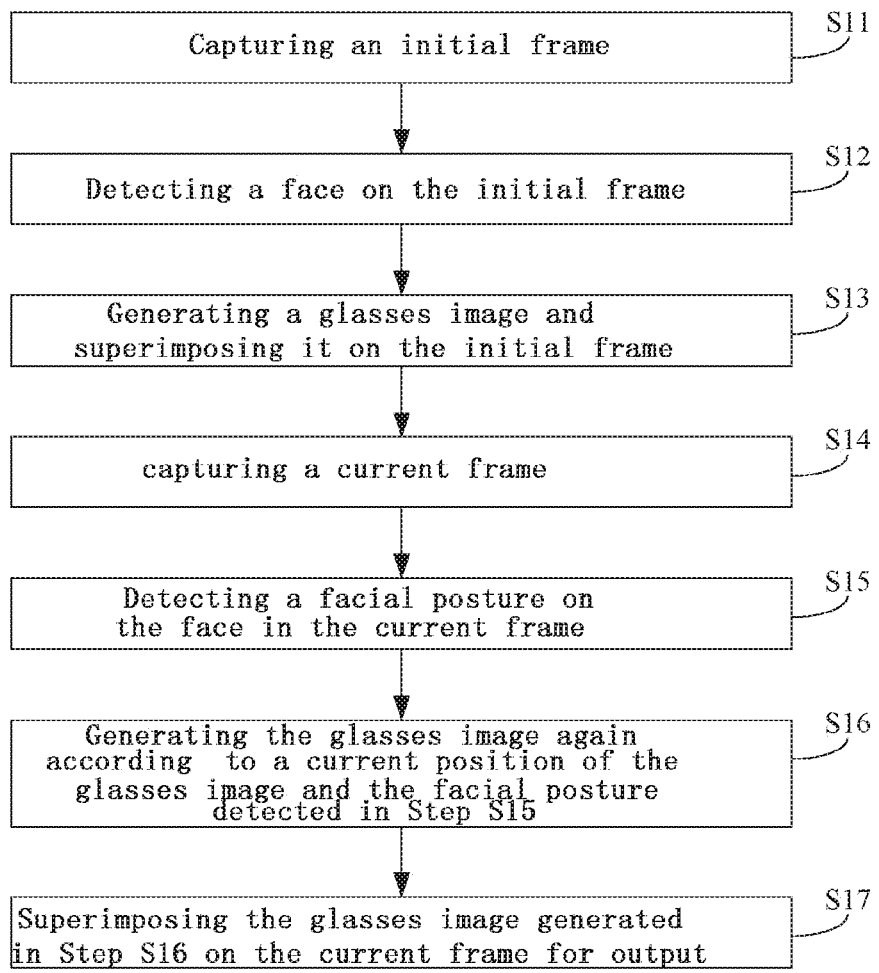
FIG. 1 is a schematic diagram of basic steps of a method for implementing virtual fitting according to an embodiment of the invention.

FIG. 1 is a schematic diagram of basic steps of a method for implementing virtual fitting according to an embodiment of the invention. As shown in FIG. 1, the method mainly includes Step S11 to Step S17 below.

Step S11: capturing an initial frame. Capturing can be started automatically in a case that the camera starts or capturing can be started according to an operating instruction of the user. For example, the user clicks a touch screen, or presses down an arbitrary or a specified button on a keyboard.

Step S12: conducting a facial detection on the initial frame. Various existing facial detection manners can be adopted to confirm that the initial frame contains the face and determines a substantial range of the face. This substantial range can be represented using a contour rectangle of the face.

Step S13: generating a glasses image and superimposing it on the initial frame. Which specific glasses image is generated is selected by the user. For example, the user clicks one of a plurality of glasses icons appearing in the screen. In this embodiment, it is preset that a division point at a position that occupies 0.3-0.35:1 of a total length in a vertical direction of the range of the face from an upper end of the range of the face is the position of the glasses. In this step, when the glasses image is superimposed on the initial frame, an initial position of the glasses image is to be superimposed on the set position of the eyes. The user can finely adjust the glasses presented on the face by dragging the glasses image.

Step S14: capturing a current frame.

Step S15: detecting a facial posture on the face in the current frame. The facial posture can be achieved by adopting various existing facial posture (or called facial gesture) detection techniques. The facial posture can be represented by a rotation parameter R (r0, r1, r2) and a translation parameter T (t0, t1, t2) together. The rotation parameter and the translation parameter respectively represent rotation angles of one plane on three coordinate planes and translation lengths on three coordinate axes relative to an initial position. In this embodiment, an initial position of a facial image is the position of the facial image in the initial frame, thus, with regard to each current frame, it is compared with the initial frame to obtain the facial posture in the current frame, i.e., the above rotation parameter and translation parameter. That is, the facial posture of each frame after the initial frame is a posture formed relative to the facial posture in the initial frame.

Step S16: generating the glasses image again according to a current position of the glasses image and the facial posture detected in Step S15. In this step, a glasses posture in the glasses image is required to be consistent with the facial posture. Thus, a current position of the glasses image is to be taken as a starting position, a rotation end value and a translation end value of the glasses in the glasses image are determined according to the rotation parameter and the translation parameter of the facial posture, and then the glasses image is generated accordingly.

Step S17: superimposing the glasses image generated in Step S16 on the current frame for output. At this time, the outputted glasses image has been located near the eyes on the face in the current frame for it is subjected to the process in Step S16. To this step, the glasses image has been superimposed on the current frame. With regard to each frame captured thereafter, it is also processed according to the above flow, i.e., Step S14 is returned to.

Figure 3:
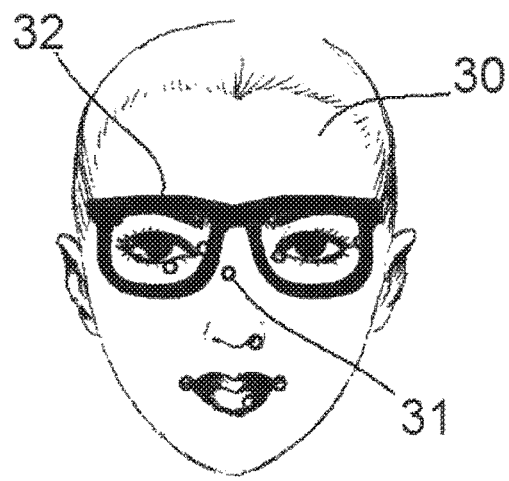
FIG. 3 is a schematic diagram of captured feature points according to the embodiment of the invention.

In a case that the glasses image has been superimposed on the current frame, the user can see a state as shown in FIG. 3. For clear illustration, a portrait 30 with black and white single lines in the figure is used to replace a portrait actually captured by the camera. This portrait wears glasses 32. This solution can not only achieve fitting of the glasses but also achieve fitting of jewelries such as ear loops and necklaces. With regard to the fitting of the necklaces, the captured face should include the neck.

Figure 2:
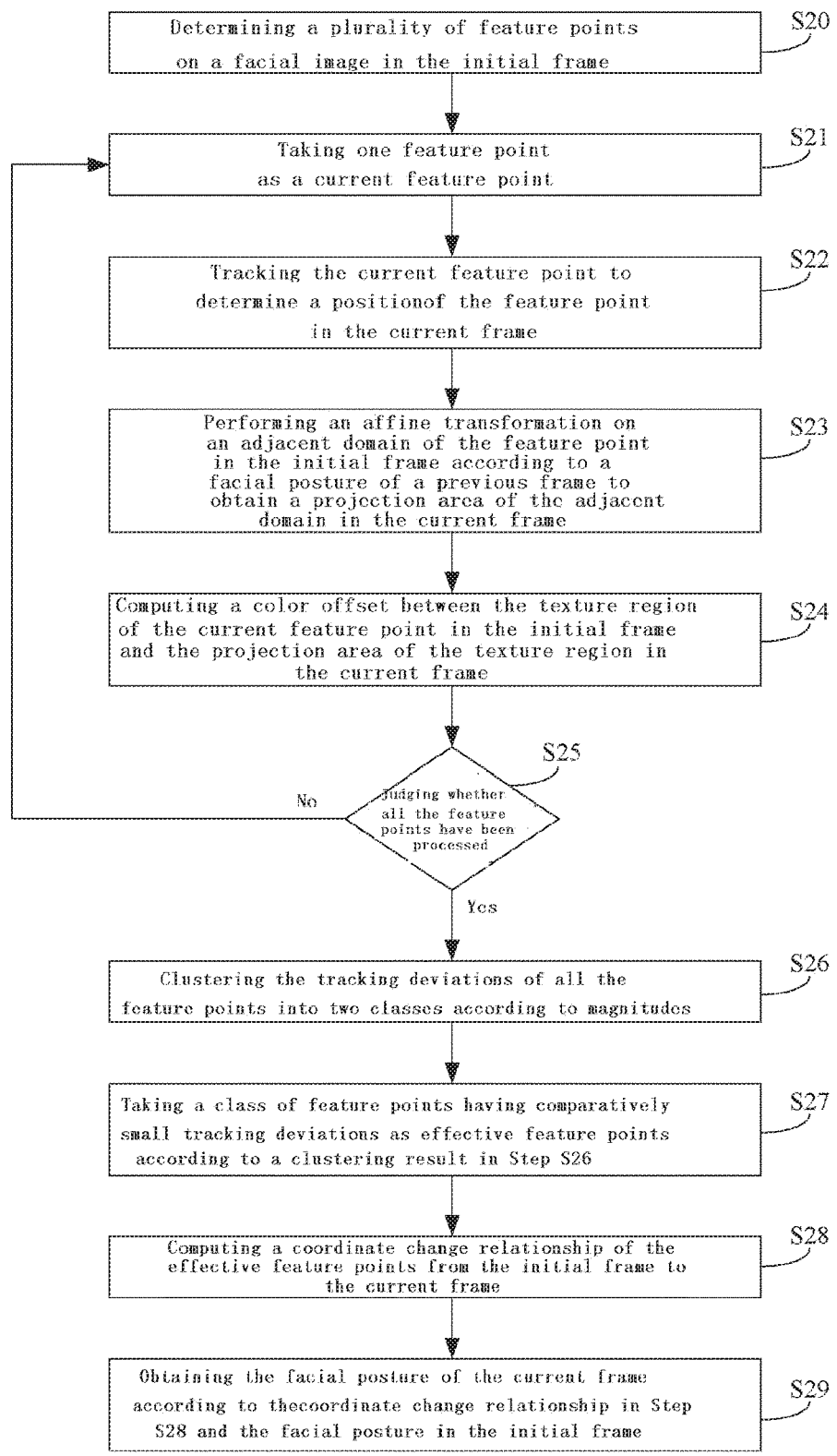
FIG. 2 is a schematic diagram of main steps of a facial posture detection according to the embodiment of the invention.

The contents below describe a manner of detecting the facial posture adopted in this embodiment. FIG. 2 is a schematic diagram of main steps of a facial posture detection according to the embodiment of the invention. As shown in FIG. 2, the method mainly includes Step S20 to Step S29 below.

Step S20: determining a plurality of feature points on a facial image in the initial frame. Since the feature points are to be tracked in the succeeding steps, the selection of the feature points in this step should consider that the feature points should be easily tracked. Points rich in textures around or points having comparatively large color gradients can be selected, and such points are still easily identified when the position of the face changes. The following documents can be referred to: Jean-Yves Bouguet, "Pyramidal Implementation of the Lucas Kanade Feature Tracker Description of the algorithm", Technical report, Microprocessor Research Labs, Intel Corporation (1999); and Jianbo Shi Carlo Tomasi, "Good features to track", Proc. IEEE Comput. Soc. Conf. Comput. Vision and Pattern Recogn., pages 593-600, 1994.

The captured feature points are as shown in FIG. 3. FIG. 3 is a schematic diagram of captured feature points according to the embodiment of the invention. In FIG. 3, a plurality of small circles, e.g., a circle 31, represent the captured feature points. Next, a deviation of a texture region is determined for each feature point, and this deviation is actually just a tracking error of the feature point.

Step S21: taking one feature point as a current feature point. The feature points can be numbered, and are taken according to a numbering sequence each time. Step S22 to Step S24 are processes of one feature point.

Step S22: tracking the current feature point to determine a position of the feature point in the current frame. Various current feature point tracking methods can be adopted, e.g., an optical flow tracking method, a templates matching method, a particle filtering method, a feature point detecting method, etc. The optical flow tracking method can adopt a Lucas & Kanade method. With regard to various algorithms of tracking of the feature points, errors exist in all applications, it can be hardly ensured that all the feature points can be accurately positioned in a new frame, so in this embodiment, the tracking of the feature point is improved, and with regard to each feature point, an adjacent domain (called the texture region in the descriptions of the succeeding steps) of the feature point within a certain range when the feature point is in the initial frame is compared with an adjacent domain of the feature point within a corresponding range when it is in the current frame to obtain a difference to determine whether this feature point is tracked accurately, i.e., a processing manner in the subsequent step.

Figure 4A:
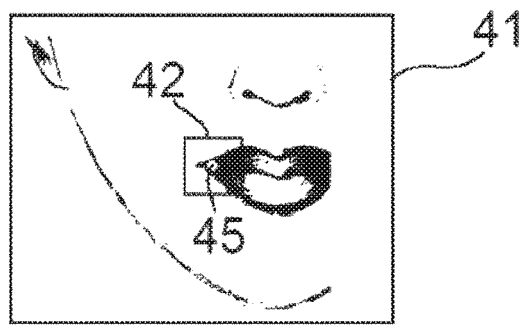
FIGS. 4A and FIG. 4B are respectively schematic diagrams of texture regions taken in an initial frame and a current frame according to the embodiment of the invention.
Figure 4B:
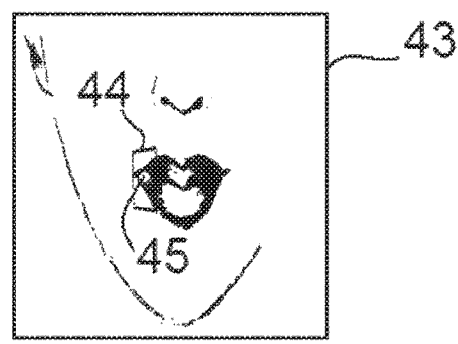

Step S23: performing an affine transformation on an adjacent domain of the feature point in the initial frame according to a facial posture of a previous frame to obtain a projection area of the adjacent domain in the current frame. Since the face between two frames is inevitably rotated more or less, it is the best to perform the affine transformation to make partial regions of the two frames be comparable. FIG. 4A and FIG. 4B, which are respectively schematic diagrams of texture regions taken in an initial frame and a current frame according to the embodiment of the invention, are referred to. A rectangular region taking the feature point as the center is generally taken as the texture region of the feature point. As shown in FIG. 4A and FIG. 4B, a texture region of a feature point 45 (the white point in the figure) in an initial frame 41 (a part of the frame as shown in the figure) is a rectangle 42, and a texture region in a current frame 43 is a trapezoid 44. This is because that to the current frame, the face turns left by a certain angle, and if the texture region is still taken around the feature point 45 in FIG. 4B according to the size of the rectangle 42, a pixel having too large a range will be captured or even in some other cases a background image will be captured. Thus, it is the best to perform the affine transformation to project the texture region of the feature point in the initial frame onto a plane of the current frame, so that the texture regions of the feature point in different frames are comparable. Thus, the texture region of the feature point in the current frame is actually the above projection region.

Step S24: computing a color offset between the texture region of the current feature point in the initial frame and the projection area of the texture region in the current frame. The color offset is just a tracking deviation for the feature point. During computation, grey values of respective pixel points of the current feature point in the texture region in the initial frame are connected to form a vector according to rows or columns of the pixel, a length of the vector is just a total amount of the pixel points of the texture region; and the pixels of the above projection region are connected according to the rows or columns, and then equally divided according to the total amount, a grey value of a pixel having a comparatively large proportion is taken as the grey value of each grid obtained by the equal division, the grey values of all the grids are connected to form another vector, and a length of the vector is equal to the above total amount. A distance between these two vectors is computed to obtain a numerical value, and the magnitude of this numerical value just reflects the tracking deviation of the feature point. Since it is only required to obtain the tracking deviation, a vector obtained by adopting the grey value is shorter than that obtained by adopting an RGB value, which facilitates reduction of a computation amount. The distance between the vectors herein can be represented by adopting a Euclidean distance, a Mahalanobis distance, a cosine distance, a relevant system and the like. Step S25 is entered after this step.

Step S25: judging whether all the feature points have been processed. If so, Step S26 is entered, and if not, Step S21 is returned to.

Step S26: clustering the tracking deviations of all the feature points into two classes according to magnitudes. An arbitrary self-clustering method, e.g., a K-means self-clustering method, can be adopted. During computation, the maximum value and the minimum value of the tracking deviations of all the feature points are taken as initial centers to thereby perform clustering to obtain two classes that respectively have comparatively large tracking deviations and comparatively small tracking deviations.

Step S27: taking a class of feature points having comparatively small tracking deviations as effective feature points according to a clustering result in Step S26. Correspondingly, the other feature points serve as ineffective feature points.

Step S28: computing a coordinate change relationship of the effective feature points from the initial frame to the current frame. This coordinate change relationship is represented by a matrix P. Various existing algorithms, e.g., a Levenberg-Marquardt algorithm, can be adopted. The following document can be referred to:

Z. Zhang. "A flexible new technique for camera calibration". IEEE Transactions on Pattern Analysis and Machine Intelligence, 22(11):1330-1334, 2000.

Further, algorithms in the following documents can be further referred to:

F. Moreno-Noguer, V. Lepetit and P. Fua "EPnP: Efficient Perspective-n-Point Camera Pose Estimation"; and X. S. Gao, X.-R. Hou, J. Tang, H.-F. Chang; "Complete Solution Classification for the Perspective-Three-Point Problem".

Step S29: obtaining the facial posture of the current frame according to the coordinate change relationship in Step S28 and the facial posture in the initial frame. That is, a rotation parameter $R_n$ and a translation parameter $T_n$ of the current frame (the nth frame) are obtained by computation according to the above matrix P, the above rotation parameter R and the above translation parameter T.

The contents above describe that the facial posture in the current frame is a computation manner. Other facial posture detection algorithms can be also adopted during implementation to obtain the facial posture in the current frame. The facial posture in the current frame can be utilized to modify the above ineffective feature points. That is, new coordinates of these ineffective feature points are computed according to the above rotation parameter $R_n$, the above translation parameter $T_n$ and the coordinates of the ineffective feature points in the initial frame, and the new coordinates are used to replace the coordinates of the ineffective feature points in the current frame. The coordinates of all the feature points in the current frame after the replacement will be used to perform data processing of the next frame. This facilitates increase of an accuracy of the processing of the next frame. It is also allowed to only use an effective feature value in the current frame to perform the processing of the next frame, but this will reduce an amount of available data.

According to the above manner, the glasses image will be imposed on each frame, so that the user can still see that the glasses are "worn" on the face in a case that the user rotates his or her head. If the action of the head of the user is comparatively violent, too large a posture change is resulted in, especially when such action is made in a case of insufficient light, the feature point can hardly be accurately tracked, and the glasses in the screen will depart from the position of the eyes. In this case, it is allowed to prompt the user to perform a reset operation. For example, a one-click to a screen or a specified key is performed again, and at this time, the camera captures the head portrait of the user and presents the glasses at the eyes of the head portrait of the user. In this case, the operation of the user gives a reset instruction, and after a mobile phone or computer receives the reset instruction, the current frame captured by the camera is used as the above initial frame and is processed according to the above method. During the processing, a processing result of clustering is obtained in Step S27, it is allowed to perform a judgment therefor, if the proportion of the effective feature points is smaller than a preset value, e.g., 60%, or the proportion of the feature points captured in this frame to the feature points captured in the previous frame is smaller than a preset value, e.g., 30%, prompt information, e.g., a text "one-click to the screen so as to reset", is outputted to prompt the user to newly "try on" the glasses.

Figure 5:
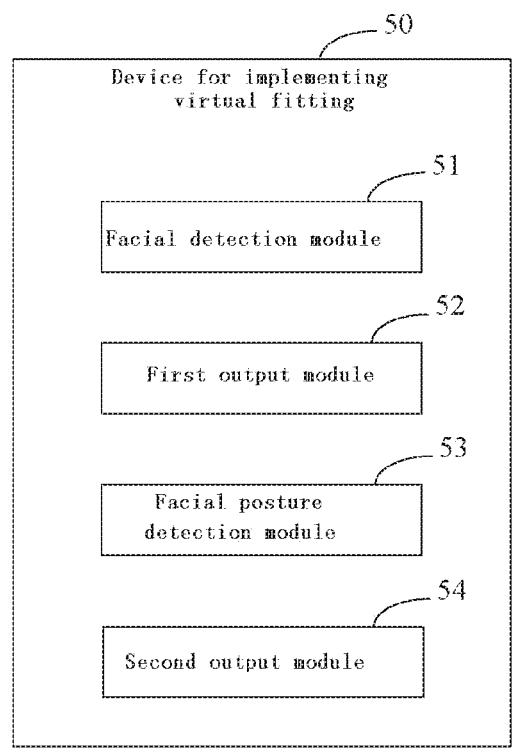
FIG. 5 is a schematic diagram of a basic structure of a device for implementing virtual fitting according to the embodiment of the invention.

FIG. 5 is a schematic diagram of a basic structure of a device for implementing virtual fitting according to the embodiment of the invention. The device can be arranged in a mobile phone or computer as software. As shown in FIG. 5, a device 50 for implementing virtual fitting mainly comprises a facial detection module 51, a first output module 52, a facial posture detection module 53, and a second output module 54.

The facial detection module 51 is used to detecting a face on a captured initial frame. The first output module 51 is used for generating an article image at an initial position in a case that the face has been detected, and then superimposing the article image on the initial frame for output, the initial position superimposed on a specific position of the face in the initial frame. The facial posture detection module 53 is used for detecting a facial posture on the face in the current frame to obtain the facial posture of the current frame. The second output module 54 is used for generating the article image again according to a current position of the article image and the facial posture, making an article posture in the article image be consistent with the facial posture, and then superimposing the article image on the current frame for output.

The facial posture detection module 53 can be further used for: determining a plurality of feature points on a facial image in the initial frame; performing the following processes with respect to each of the feature points: tracking the feature point to determine a position of the feature point in the current frame, performing an affine transformation on an adjacent domain of the feature point in the initial frame according to a facial posture of a previous frame to obtain a projection area of the adjacent domain in the current frame, computing a color offset between the adjacent domain in the initial frame and the projection area in the current frame and using it as a tracking deviation of the feature point, and selecting a plurality of feature points having comparatively small tracking deviations for the determined plurality of feature points; and determining the facial posture of the current frame according to positions of the plurality of feature points having the comparatively small tracking deviations in the initial frame and in the current frame.

The facial posture detection module 53 can be further used for: obtaining two classes by performing clustering according to the magnitudes of the tracking deviations for the tracking deviations of the determined plurality of feature points, by using the maximum value and the minimum value therein as initial centers; and selecting the feature points corresponding to one class having the comparatively small tracking deviations in the two classes.

The device 50 for implementing virtual fitting can further comprise a modification module (not shown in the figure) for projecting the feature points corresponding to one class having the comparatively large tracking deviations in the two classes onto an image plane of the current frame according to the facial posture of the current frame after the facial posture detection module determines the facial posture of the current frame, and using projection positions to replace the positions of these feature points in the current frame.

The device 50 for implementing virtual fitting can further comprise a reset module and a prompt module (not shown in the figure), wherein the reset module is used for receiving a reset instruction, and using the captured current frame as the initial frame in a case of receiving the reset instruction; and the prompt module is used for outputting prompt information in a case that a proportion of the number of the feature points corresponding to the one class of having the comparatively small tracking deviations to the total number of the feature points is larger than a first preset value, or a proportion of the number of the feature points captured in the current frame to the total number of the feature points captured in the previous frame is smaller than a second preset value, after the facial posture detection module obtains two classes by performing clustering according to the magnitudes of the tracking deviations.

According to the technical solution of the embodiment of the invention, by detecting the facial postures of the respective frames and then adjusting glass postures according to the facial postures, the user can be made to implement the virtual fitting by utilizing a common image capturing device, and the user may rotate his or her head to observe wearing effects at multiple angles, which has a comparatively high reality.

The contents above describe the basic principle of the invention by taking the embodiments into consideration, but it should be noted that those skilled in the art can understand that all of or any of steps or components of the method and device of the invention can be achieved by hardware, firmware, software or a combination thereof in any computing apparatus (including a processor, a storage medium, etc.) or a network of a computing apparatus. This can be achieved by those skilled in the art just by using their basic programming skills in the case of reading the descriptions of the invention.

Thus, the object of the invention can be further achieved by running a program or a set of programs on any computing apparatus. The computing apparatus can be a common universal apparatus. Thus, the object of the invention can be also achieved only by providing a program product containing a program code for achieving the method or device. That is to say, such program product also forms the invention, and a storage medium storing such program product also forms the invention. Obviously, the storage medium can be any common storage medium or any storage medium to be developed in the future.

It should be further noted that in the device and method of the invention, it is obvious that the respective components or respective steps can be separated and/or recombined. These separations and/or re-combinations shall be deemed as equivalent solutions of the invention. Furthermore, the steps for performing the above-mentioned series of processes can be naturally chronologically performed in the described order, but are not necessarily chronologically performed. Some steps can be performed in parallel or independently of each other.

The above embodiments do not form limitations of the scope of protection of the invention. Those skilled in the art should understand that depending on requirements for design and other factors, various modifications, combinations, sub-combinations and substitutions can occur. Any modification, equivalent substitution, improvement and the like made within the spirit and principle of the invention shall be contained in the scope of protection of the invention.

The invention claimed is:

1. A method for implementing virtual fitting, the method comprising:
   detecting a face on a captured initial frame, generating an article image at an initial position in a case that the face has been detected, and then superimposing the article image on the initial frame for output, the initial position superimposed on a specific position of the face in the initial frame;
   detecting a facial posture on the face in the current frame to obtain the facial posture of the current frame; and
   generating the article image again according to a current position of the article image and the facial posture, making an article posture in the article image be consistent with the facial posture, and then superimposing the article image on the current frame for output;
   characterized in that the step of detecting a facial posture on the face in the current frame to obtain the facial posture of the current frame comprises:
   determining a plurality of feature points on a facial image in the initial frame;

performing the following processes with respect to each of the feature points:

tracking the feature point to determine a position of the feature point in the current frame, performing an affine transformation on an adjacent domain of the feature point in the initial frame according to a facial posture of a previous frame to obtain a projection area of the adjacent domain in the current frame, computing a color offset between the adjacent domain in the initial frame and the projection area in the current frame and using it as a tracking deviation of the feature point, and selecting a plurality of feature points having comparatively small tracking deviations for the determined plurality of feature points; and determining the facial posture of the current frame according to positions of the plurality of feature points having the comparatively small tracking deviations in the initial frame and in the current frame.

2. The method according to claim 1, characterized in that the step of selecting a plurality of feature points having comparatively small tracking deviations for the plurality of feature points comprises:

for the tracking deviations of the determined plurality of feature points, by using the maximum value and the minimum value therein as initial centers, obtaining two classes by performing clustering according to the magnitudes of the tracking deviations; and selecting the feature points corresponding to one class having the comparatively small tracking deviations in the two classes.

3. The method according to claim 2, characterized by, after the step of determining the facial posture of the current frame, further comprising:

projecting the feature points corresponding to one class having the comparatively large tracking deviations in the two classes onto an image plane of the current frame according to the facial posture of the current frame, and using projection positions to replace the positions of these feature points in the current frame.

4. The method according to claim 2, characterized in that before the step of detecting a face on a captured initial frame, the method further comprises:

using the captured current frame as the initial frame in a case of receiving a reset instruction; after the step of obtaining two classes by performing clustering according to the magnitudes of the tracking deviations, the method further comprises:

outputting prompt information and then receiving the reset instruction in a case that a proportion of the number of the feature points corresponding to one class having the comparatively small tracking deviations to the total number of the feature points is smaller than a first preset value, or a proportion of the number of the feature points captured in the current frame to the total number of the feature points captured in the previous frame is smaller than a second preset value.

5. The method according to claim 1, characterized in that the article image is a glass image, a head jewelry image, or a neck jewelry image.

6. A device for implementing virtual fitting, the device comprising at least one processor, the at least one processor configured to:

detect a face on a captured initial frame;

generate an article image at an initial position in a case that the face was captured and then superimpose the article image on the initial frame for output, the initial position superimposed on a specific position of the face in the initial frame;

detect a facial posture on the face in the current frame to obtain the facial posture of the current frame; and generate the article image again according to a current position of the article image and the facial posture, make an article posture in the article image be consistent with the facial posture, and then superimpose the article image on the current frame for output;

characterized in that the at least one processor is configured to detect the face on the captured initial frame by:

determining a plurality of feature points on a facial image in the initial frame;

performing the following processes with respect to each of the feature points:

tracking the feature point to determine a position of the feature point in the current frame, performing an affine transformation on an adjacent domain of the feature point in the initial frame according to a facial posture of a previous frame to obtain a projection area of the adjacent domain in the current frame, computing a color offset between the adjacent domain in the initial frame and the projection area in the current frame and using it as a tracking deviation of the feature point, and selecting a plurality of feature points having comparatively small tracking deviations for the determined plurality of feature points; and determining the facial posture of the current frame according to positions of the plurality of feature points having the comparatively small tracking deviations in the initial frame and in the current frame.

7. The device according to claim 6, characterized in that the at least one processor is configured to detect the face on the captured initial frame by:

for the tracking deviations of the determined plurality of feature points, using the maximum value and the minimum value therein as initial centers, obtaining two classes by performing clustering according to the magnitudes of the tracking deviations; and selecting the feature points corresponding to one class having the comparatively small tracking deviations in the two classes.

8. The device according to claim 7, characterized in that the at least one processor is further configured to project the feature points corresponding to the one class having the comparatively large tracking deviations in the two classes onto an image plane of the current frame according to the facial posture of the current frame after determining the facial posture of the current frame, and use projection positions to replace the positions of these feature points in the current frame.

9. The device according to claim 7, characterized in that the at least one processor is further configured to receive a reset instruction, and use the captured current frame as the initial frame in a case of receiving the reset instruction; and output prompt information in a case that a proportion of the number of the feature points corresponding to the one class having the comparatively small tracking deviations to the total number of the feature points is smaller than a first preset value, or a proportion of the number of the feature points captured in the current frame to the total number of the feature points captured in the previous frame is smaller than a second preset value, after obtaining two classes by performing clustering according to the magnitudes of the tracking deviations.

10. The device according to claim 6, characterized in that the article image is a glasses image, a head jewelry image, or a neck jewelry image.

* * * * *